United States Patent [19]

Janashak et al.

[11] Patent Number: 4,708,175
[45] Date of Patent: Nov. 24, 1987

[54] METHOD AND APPARATUS FOR AUTOMATED FILLING OF A CONTAINER WITH A FLUID

[75] Inventors: Robert J. Janashak, Rochester Hills; Christopher G. Felice, Troy; Hadi A. Akeel, Sterling Heights, all of Mich.

[73] Assignee: GMF Robotics Corporation, Auburn Hills, Mich.

[21] Appl. No.: 899,829

[22] Filed: Aug. 25, 1986

[51] Int. Cl.⁴ ............................................. B65B 3/04
[52] U.S. Cl. ....................................... 141/1; 141/98; 141/387; 901/50
[58] Field of Search ..................................... 141/1–12, 141/37–66, 98, 387; 901/50

[56] References Cited

U.S. PATENT DOCUMENTS

4,102,367  7/1978  Shulman et al. ................. 141/38 T

Primary Examiner—Houston S. Bell, Jr.
Attorney, Agent, or Firm—Brooks & Kushman

[57] ABSTRACT

Method and apparatus are disclosed for the automated filling of a container mounted on a vehicle with a fluid. In one embodiment of the fluid fill device the container is part of an engine cooling system, and in the other embodiment of the fluid fill device the container is part of an air conditioning system. Each of the fluid fill devices includes a housing in which a pair of spool valves are mounted. One of the spool valves controls the flow of vacuum and the other spool valve controls the flow of the fluid. A coupling mechanism including a movable piston releasably and fluidly connects its respective device to its container during evacuation and filling cycles. The device receives control signals from a pressurized air source to control movement of the spool valves and the pistons. If the container and the vehicle on which it is mounted are particularly well located, the device can be utilized in a hard automation system. Alternately, the device may be utilized as an end effector for mounting at the distal end of a robot arm. When utilized with the robot, the programmed motion of the robot is automatically adjusted by optically measuring the position of the container. Preferably, a compliance mechanism is interposed between the robot arm and the device to compensate for small amounts of misalignment between the device and the container.

22 Claims, 12 Drawing Figures

METHOD AND APPARATUS FOR AUTOMATED FILLING OF A CONTAINER WITH A FLUID

CROSS REFERENCE TO RELATED APPLICATIONS

Reference is hereby made to co-pending patent applications entitled "Method and System for Automatically Determining the Position and Attitude of an Object", now U.S. Pat. No. 4,639,878, and "Gray Scale Vision Method and System Utilizing Same" having Ser. No. 864,416 and filed May 19, 1986, and both having the same Assignee as the present application. These co-pending applications disclose method and systems for optically measuring the three-dimensional and two-dimensional positions, respectively, of an object at a work station and are hereby incorporated in their entirety by reference.

TECHNICAL FIELD

This invention relates in general to method and apparatus for the automated filling of a container with a fluid and, in particular, to method and apparatus for automated filling of a container mounted on a vehicle with a fluid.

BACKGROUND ART

Manual filling of containers has become generally undesirable in the automated "factory of the future" because of manpower costs and increasingly higher environmental standards for the workplace. The manufacturing environment places exacting demands on the people and tools used to fill containers mounted on a vehicle. When such containers are improperly filled, the fluid will oftentimes appear on the factory floor and/or the vehicle or result in system defects.

Automated fluid fill systems for such containers must easily adapt to production lines of material handling systems. The work cell must be designed to meet the requirements of the vehicle and its components. In addition, control systems must be compatible with factory communication systems. Finally, the systems must be able to compensate for variations in location and attitude due to manufacturing tolerances, cumulative assembly tolerances, vehicle presentation and various vehicle models.

Frequently during a vehicle assembly process, a partially completed vehicle body proceeds down an assembly line while being loosely held by a carrying fixture. The exact position of the body is not known at any work station. It goes without saying that containers for liquids such as fuel, brake fluid, transmission fluid, coolants, windshield wiper fluid, refrigerants, oil, water, etc. mounted on the vehicle also have indeterminate positions. Each container is located within a finite window of uncertainty which is both known and constant.

A related problem is that of non-rigid bodied. In practice it has been observed that "identical" vehicle bodies produced on the same assembly line will often have unpredictable dimensional irregularities. These irregularities and the compliance of a partially completed body have come to be accepted artifacts of modern design and manufacturing practices. It is clear that future manufacturing systems must be able to gracefully tolerate these irregularities.

One possible solution to these problems is to design the entire assembly process to extremely high tolerances to ensure that the vehicle location in space is invariant from one vehicle to the next. Also, it must be ensured that the containers and vehicle bodies are indeed "identical". Such an approach oftentimes requires a relatively high initial investment and expensive retooling costs to fill different containers with different fluids.

Vision systems oftentimes offer immediate advantages in reducing tooling and fixture costs. Vision systems can also provide more accuracy and precision than other methods in determining location. This added accuracy, coupled with precision robots, can be used to accomplish tasks which are presently cost ineffective.

Robots are used in a wide variety of applications in industry such as painting, spot-welding, and sealing. In the mechanical assembly industry, robots are used for palletizing/depalletizing parts and unloading parts from trays for assembly operations. In application areas where the capabilities of the traditional "blind" robot fall short, machine vision becomes an integral part of the robot system to assist in end effector guidance. The totally-integrated, visually-guided robotic system results in enhanced manufacturing productivity, improved quality and reduced fixturing costs, which cannot be achieved with conventional robotic systems.

Applications of machine vision in robotic systems have not all been "success" stories. Many plant engineers still face the formidable task of interfacing vision systems to robots and devote major engineering effort to achieve a workable illumination environment. Though vision systems have often worked well with robots, there is still a broad class of applications which have been marginally operational and which could be better handled with different approaches. There are also many potentially successful vision-robot applications yet to be explored.

Many industrial robotic applications require the accurate positional location of identical components within a finite work area. Typical examples might be the loading or unloading of automotive parts from parts trays, the picking up of a part which has been loosely positioned by a parts feeder, or the identification and location of a part which has been cycled into a work cell for a robotic operation. Experience has shown that the essential problem in many robotic applications is the location of a rigid body which is constrained to movement within a plane. In these two-dimensional cases, the position of the rigid body is completely specified by only three degrees of freedom: The body is only free to slide in the two planar dimensions, and to rotate about an axis perpendicular to the plane.

The U.S. Patents to Blanchard et al 3,618,742, Michaud et al 3,804,270, Birk et al 4,146,924, Pryor et al 4,373,804 and Masaki 4,380,696 disclose machine vision systems which provide visual data which is subsequently processed and put into a form utilized to alter the pre-programmed path of a robot so that the robot can perform work on the object. Such prior art methods and systems, however, are inadequate to solve the compliance and irregularity problems of vehicle bodies and the containers they support in a factory environment.

SUMMARY OF THE INVENTION

An object of the present invention is to provide method and apparatus for the automated filling of a container mounted on a vehicle with a fluid.

Another object of the present invention is to provide method and apparatus for the automated filling of a container with the fluid at a work station and including an end effector which is moved through a variable programmed motion to the actual container location so that the end effector mates with the container.

Yet still another object of the present invention is to provide method and apparatus for the automated filling of a container on a vehicle with a fluid at a work station including an end effector for filling the container with the fluid.

In carrying out the above objects and other objects of the present invention, a method is provided for the automated filling of a container fixedly mounted on a vehicle to move therewith at a work station. A device is provided for putting a fluid into the container. The method comprises the steps of moving the vehicle into the work station, locating the vehicle at the work station so that the container is positioned at an expected container location and automatically moving the device through a predetermined motion to the expected container location so that the device mates with the container. The method further comprises the steps of automatically controlling the device so that the device puts the fluid into the container.

The step of locating the vehicle at the work station may be precisely eliminated if the device is moved through a variable programmed motion and the step of moving the device includes the step of automatically adjusting the variable programmed motion towards the acutal container position.

Further in carrying out the above objects and other objects of the present invention, a device is provided for use in an automatic fluid fill system including a fluid source, a first controller for providing control signals, a manipulator and a second controller for controlling the manipulator. The manipulator moves the device at a work station to permit the device to automatically put the fluid into the container during a fill cycle. The device comprises a housing adapted to be connected to the manipulator and having at least one supply passage extending therethrough. The device further comprises coupling means adapted to receive a first control signal from the first controller for releasably and fluidly connecting the device to the container. A control valve is mounted within the housing and is adapted to receive a control signal from the first controller to open the supply passage during the fill cycle to put the fluid into the container.

To facilitate the flow of fluid into the container and, in some cases, to elimiate water vapor the container may be at least partially evacuated during an evacuation cycle immediately before the fill cycle. The device would then further include a vaccum supply passage and a second control valve mounted within the housing and adapted to receive a third control signal from the first to open the vacuum supply passage during the evacuation cycle.

When the manipulator takes the form of a robot, the device takes the form of an end effector which is moved by the robot through a variable programmed motion.

Preferably, if the vehicle on which the container is mounted is not precisely located at the work station, a machine vision system can be utilized to optically determine the position of the vehicle at the work station. The machine vision system may either determine the three-dimensional position of the vehicle or the machine vision system may measure the two-dimensional position of the container. If the position is measured two-dimensionally, a compliance mechanism is preferably utilized to properly align the end effector with the container.

Methods and apparatus for the automated filling of a container with a fluid as described above provide numerous advantages. For example, such methods and apparatus can be readily incorporated into an automated "factory of the future" due to the cost savings and environmental safety inherent therein. Also, such methods and apparatus are flexible and are also compatible with factory communication systems to be able to compensate for changes in either the container and/or the vehicle. Reduced tooling and fixture costs are also benefits flowing from the use of such methods and apparatus as compared to other automation methods and apparatus.

Other advantages of the present invention will be readily appreciated as the same becomes better understood by reference to the following detailed description when considered in connection with the accompanying drawings.

BEST MODES FOR CARRYING OUT THE INVENTION

Figure 1:
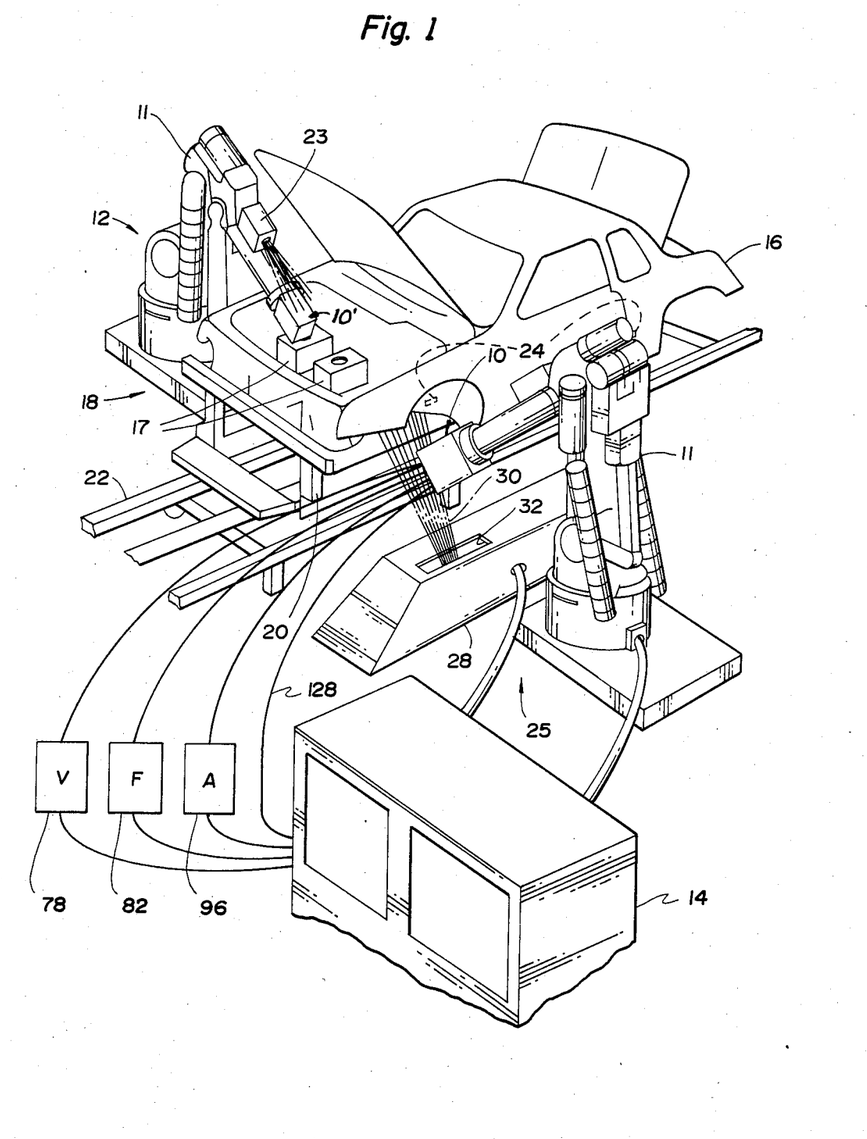
FIG. 1 is an perspective view illustrating the operation of the method and apparatus of the present invention with respect to a partially assembled automotive vehicle at a work station or cell having a robot disposed on both sides of the automotive vehicle.

Referring now to FIG. 1 there is illustrated the operation of the method and apparatus for filling containers with fluid which are not only robust (i.e. relatively unaffected by change in carrier body or container position) but also is flexible. By being flexible, the apparatus can readily adapt to changes in containers, fluids for filling the containers and body design variations. Use of the method and system not only result in higher productivity but also in improved quality. Such fluids may include water, refrigerant, windshield wiper fluid, oil, fuel, brake fluid, transmission fluid, etc.

The apparatus or device constructed in accordance with the present invention is generally indicated at 10. The device 10 is intended, but not limited, to be employed as an end effector mounted at the distal end of the arm of a robot, such as robots 11. The robots 11 are located at a work station or cell, generally indicated at 12. At the work station 12, a controller 14 of the robots 11 is capable of communicating with programmable controllers, numerically controlled machinery, vision systems, plant data management systems and the like.

The device 10 may be readily changeable so that a different device may be used as an end effector on the same robot. Also, it is to be understood that the device 10 may be used to fill a moving container, provided the robot 11 is capable of tracking the moving vehicle.

In the application of the device 10 as illustrated in FIG. 1, one of the robots 11 is utilized to move the device 10 through a variable programmed motion relative to an automotive vehicle body 16 and one of the containers 17 supported thereby. However, it is to be understood that the device 10 may also be utilized in other systems for filling containers.

As illustrated in FIG. 1, the vehicle body 16 is moved along a conveyor line, generally indicated at 18. The vehicle body 16 is mounted on a carriage 20 which, in turn, is mounted for movement on a track 22 in a well-known fashion. The partially completed vehicle body 16 may be either loosely or fixedly held by the carriage 20 so that the exact position of the body 16 may or may not be known. However, the use of a 2-D or 3-D machine vision system allows the robots 11 to automatically adjust their variable programmed paths. In particular, a 2-D system including a camera located in a housing 23, is mounted on one of the robots 11 as disclosed in the above-noted application entitled "Gray Scale Vision Method and System Utilizing Same". Alternatively, the camera may be mounted overhead the work station 12. A 3-D machine vision system, generally indicated at 25, as more fully described in the other above-noted application, may also be employed. However, it is to be understood that the preferred 3-D vision system is to be used to determine the 3-D location of the container 17 rather than the location of the vehicle body 16. Consequently, the cameras of such a system are preferably also mounted overhead or on one of the robots.

As described in the above-noted application entitled "Method and System for Automatically Determining the Position and Attitude of an Object", on the underside of the vehicle body 16 there are located several carefully positioned gauge holes 24. All automotive manufacturers assemble the entire structure of their vehicle body with respect to such respective gauge holes 24. The gauge holes 24 are relatively invariant and are used as a baseline for all measurements. While the body 16 as a whole may be somewhat non-rigid, the gauge holes 24 maintain a constant relationship with respect to each other.

In general, the system 25 utilizes the gauge holes 24 as visual targets or target points, therby minimizing the problem of irregularity and compliance of the vehicle body 16.

The system 25 includes a plurality of spaced apart cameras 26. The cameras 26 are positioned within housings 28 located on opposite sides of the conveyor line 18 within the work station 12. The view lines of each of the cameras 26 are illustrated at 30 and extend through slots formed through the housings 28.

Figure 2:
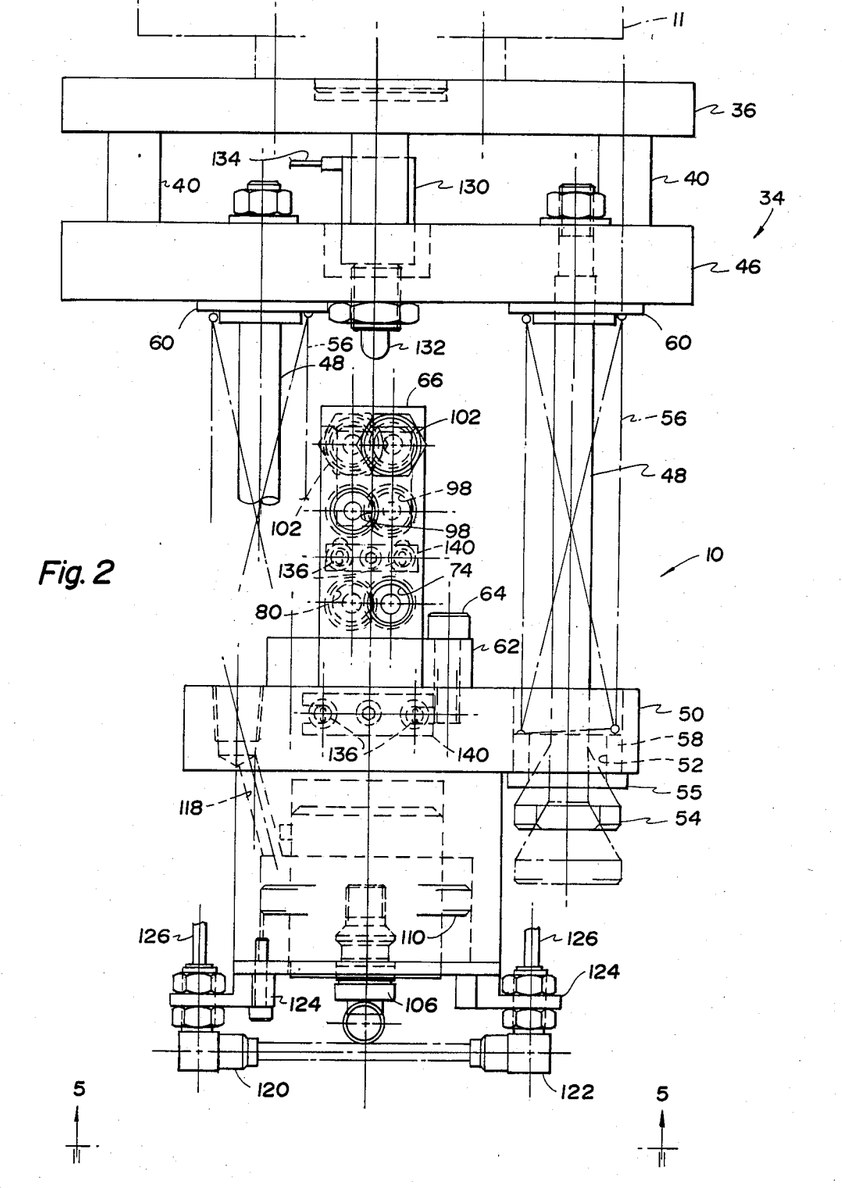
FIG. 2 is a side elevational view, partially broken away of a first embodiment of the device with an attached robot wrist indicated in phantom.
Figure 3:
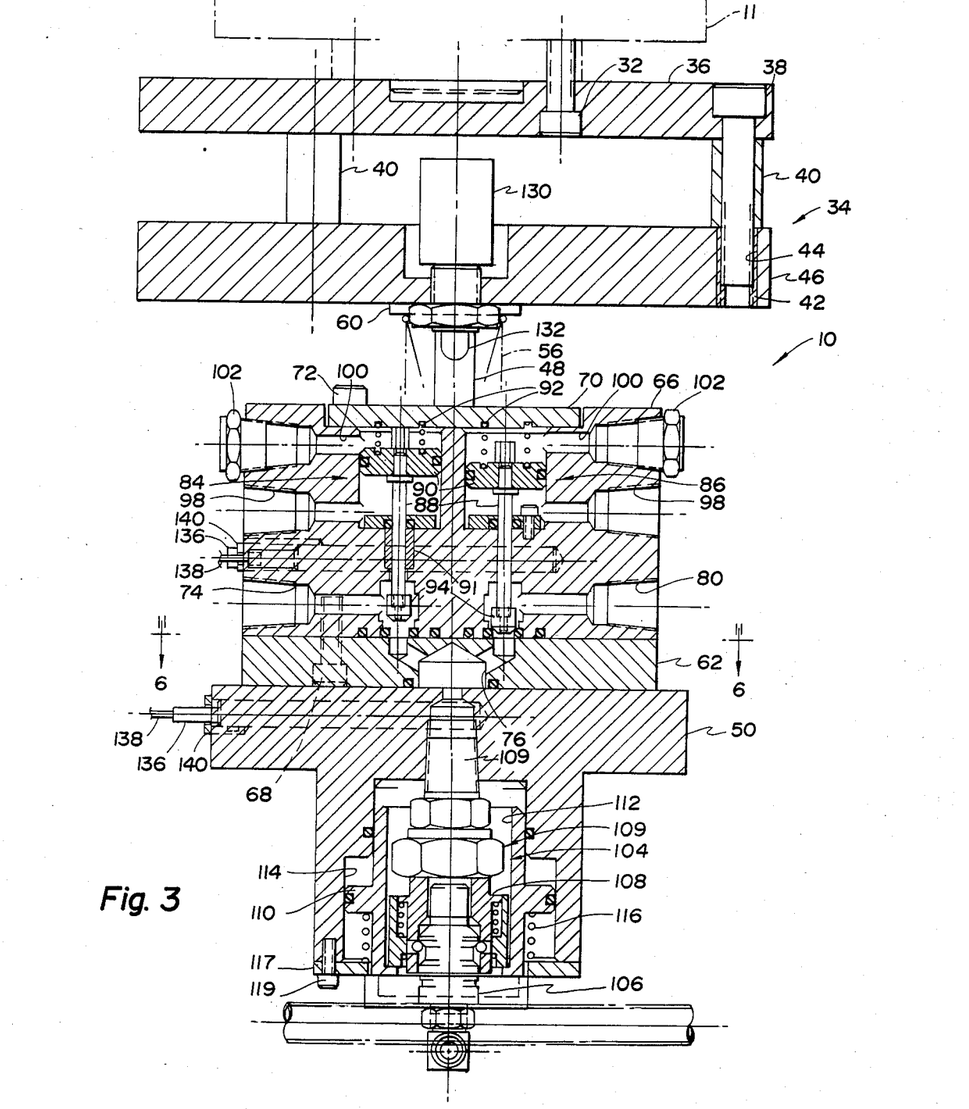
FIG. 3 is a sectional view, partially broken away and in cross section, taken along lines 3—3 in FIG. 4.
Figure 4:
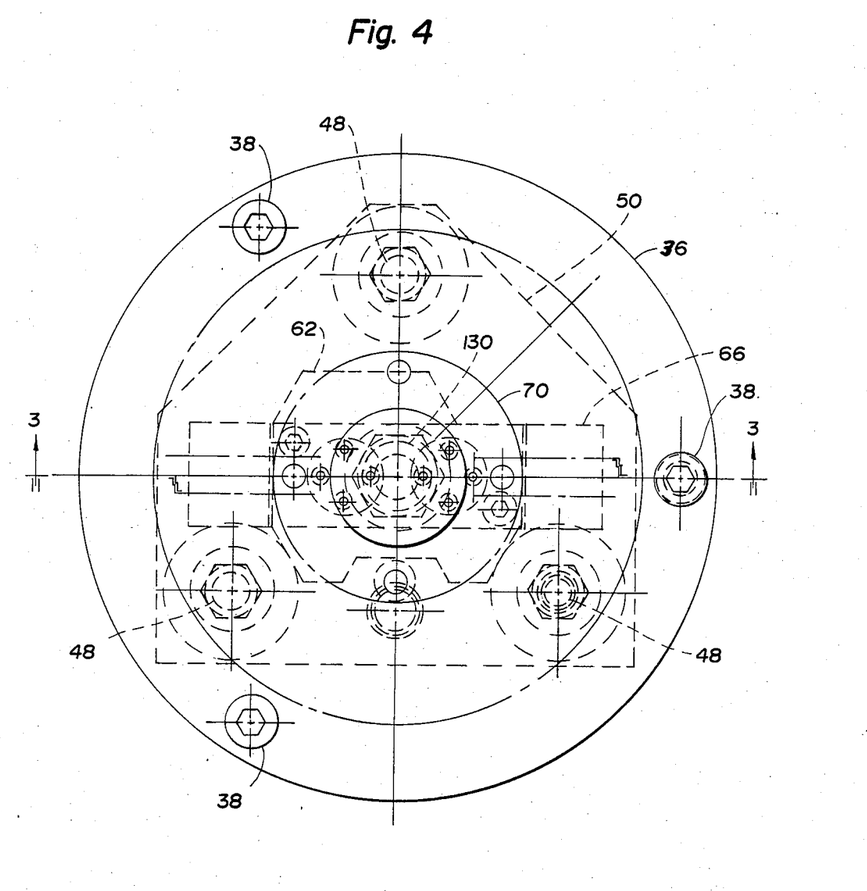
FIG. 4 is a top plan view of the device.
Figure 5:
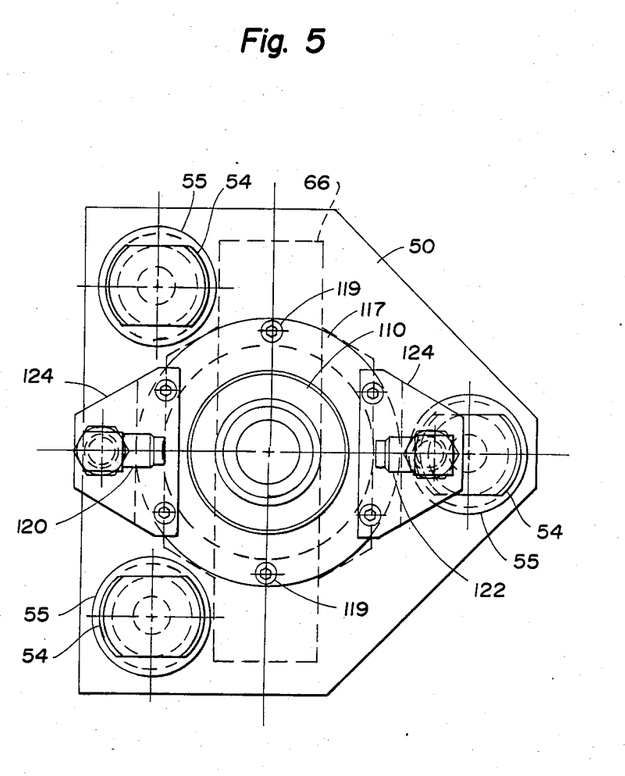
FIG. 5 is a bottom view taken along lines 5—5 in FIG. 2.

Referring now to FIGS. 2 through 7, there is illustrated a first embodiment of the device or end effector 10 constructed in accordance with the present invention. As shown in FIGS. 2 and 3, the device is adapted to be mounted to the wrist of one of the robots 11. However, it is to be understood that the device 10 can also be utilized in a hard automation system to fill its respective container 17 if the container 17 and the vehicle body 16 are particularly well located.

When the device 10 is utilized with a 2-D vision system, as illustrated at 23 on one of the robots 11, the device 10 preferably includes a compliance mechanism, generally indicated at 34. The compliance mechanism 34 is interconnected between the housing of the device 10 and the end of the robot arm to compensate for relatively small amounts of misalignment between the device 10 and the container 17 to be filled which, in this particular embodiment, comprises the refrigerant or refrigerant container of an air conditioning system. The compliance mechanism 34 is connected to the robot wrist 11 by an adaptor plate 36 and screws 32 (only one of which is shown). Screws 38 interconnect the adaptor plate 36 and a second adaptor plate 46. The screws 38 extend through spacers 40 which space the adaptor plates 46 and 36 apart. Inserts 42 are provided within apertures 44 formed through the adaptor plate 46 of the mechanism 34 so that the screws 38 threadedly attach the adaptor plate 36 to the mechanism 34.

The compliance mechanism 34 also includes three equally spaced apart locators 48 for connecting the adaptor plate 46 to a block 50 of the device housing. The locators 48 extend through apertures 52 formed completely through the block 50 so that one tapered end portion 54 of each of the locators 48 is able to move between compensated positions, such as the compensated position illustrated in phantom in FIG. 2.

The compliance mechanism 34 also includes three springs 56 which are resiliently held between shoulders 58 formed by headliners 55 threadedly mounted within the apertures 52 and retainers 60 which extend below the lower surface of the adaptor plate 46. The inner walls of the headliners 52 are adapted to engage the tapered sides of the end portions 54.

The device 10 includes a manifold 62 which is fixedly secured to the block 50 by screws 64, only one of which is shown in FIG. 2. The device 10 also includes a valve block 66 which, in turn, is fixedly connected to the manifold 62 by screws 68, only one of which is shown. The valve block 66 is closed at the top surface thereof by a cover 70 which is secured thereto by screws 72, only one of which is shown in FIG. 3.

The valve block 66 includes a vacuum supply passage 74 formed therein and extending through the manifold 62 to a common passage 76 formed in the mainfold 62. The vacuum passage 74 is provided to fluidly communicate the container 17 of the air conditioning system with a vacuum source 78 as shown in FIG. 1.

The vacuum source 78 is provided to at least partially evacuate the container 17 of the air conditioning system so that when the refrigerant is put into the container 17, the partial vacuum will speed up the filling process and remove undesirable water vapor.

Also provided within the valve block 66 is a refrigerant supply passage 80 for communicating a source of refrigerant 82, as illustrated in FIG. 1, with the container 17 of the air conditioning system. The refrigerant supply passage 80 extends through the valve block 66, through the manifold 62 and terminates at the common passage 76 in the manifold 62.

A pair of spool valves, generally indicated at 84 and 86 respectively, are slidably mounted within the valve block 66 to sequentially open and close their respective supply passages 74 and 80. In particular, each of the spool valves 84 and 86 includes a shaft 88 on one end of which there is fixedly mounted a piston 90 which is normally biased to a downward position by a spring 92 which, in turn, is resiliently held between the lower surface of the cover 70 and the top surface of the piston 90. The shafts 88 are slidably mounted in the valve block 66 by sleeve bearings 91, only one of which is shown. At the opposite end of each of the shafts 88 there is fixedly mounted a plug 94 for closing its respective supply passage 74 or 80.

The spool valves 84 and 86 are controlled by compressed air signals generated by a combined compressed air source and controller 96 which is fluidly connected to the device 10 to provide compressed air signals at the bottom surfaces of the pistons 90 through air supply passages 98 formed in the valve block 66. The opposite sides of the pistons 90 are in communication with passages 100 formed in the valve block 66. Mufflers 102 are received and retained therein to muffle the air vented out through the passages 100.

A coupling mechanism or coupling, generally indicated at 104, is mounted within the block 50 for releasably and fluidly connecting the device 10 to a Schrader valve 106 of the air conditioning system. The valve is fluidly connected to the container 17.

The coupling 104 includes the female portion 108 of a valve which is generally indicated at 109 which mates with the male Schrader valve 106 in a conventional fashion. The valve 109 also includes a male portion 109 opposite the female portion 108. The male portion 109 is threadedly mounted within the block 50 to fluidly communicate the common passage 76 with the Schrader valve 106.

The coupling 104 further includes a hollow piston 110 having an aperture 112 extending completely therethrough in which the female portion 108 is disposed. The piston 110 is slidably received and retained within a bore 114 formed in the block 50. The piston 110 is biased upwardly by a spring 116 which extends between the piston 110 and a retainer 117 secured to the bottom of the block 50 by screws 119, only one of which is shown. The top surface of the piston 110 is in fluid communication with the air source and controller 96 through an air supply passage 118, indicated in phantom in FIG. 2.

A light source 120 and a photodetector 122 are mounted to the block 50 by brackets 124. The light source 120 emits a beam of radiant energy which is interrupted by the Schrader valve 106 and its refrigerant line when the device 10 is adjacent the container 17 of the air conditioning system. When the Schrader valve 106 is fluidly connected to the device 10, the beam emitted by the light source 120 is again uninterrupted and is received by the photodetector 122 as illustrated in FIG. 2. Both the light source 120 and the photodetector 122 are electrically coupled by lines 126 which are contained within a cable 128 which extends between the device 10 and the robot controller 14 as illustrated in FIG. 1.

A limit switch 130 is mounted on the adaptor plate 46 and includes a plunger 132 to indicate engagement with the top surface of the valve block 66. In this way, damage to the device 10 and/or the container to be filled may be avoided. A line 134, also contained within the cable 128, carries a signal which alerts the robot controller 14 of such a situation.

The device 10 also includes thermal switches 136 which are disposed within the valve block 66 and the block 50 and held therewithin by retainers 140. The thermal switches 136 are electrically coupled by lines 138 to the controller 14, again within the cable 128. The thermal switches 136 heat the valve block 36 and the block 50 to facilitate the flow of refrigerant therein during the operation of the device 10. In particular, the thermal switches 136 provide heat to overcome the heat loss when the flow of refrigerant is quickly disconnected from the container 17.

Figure 6:
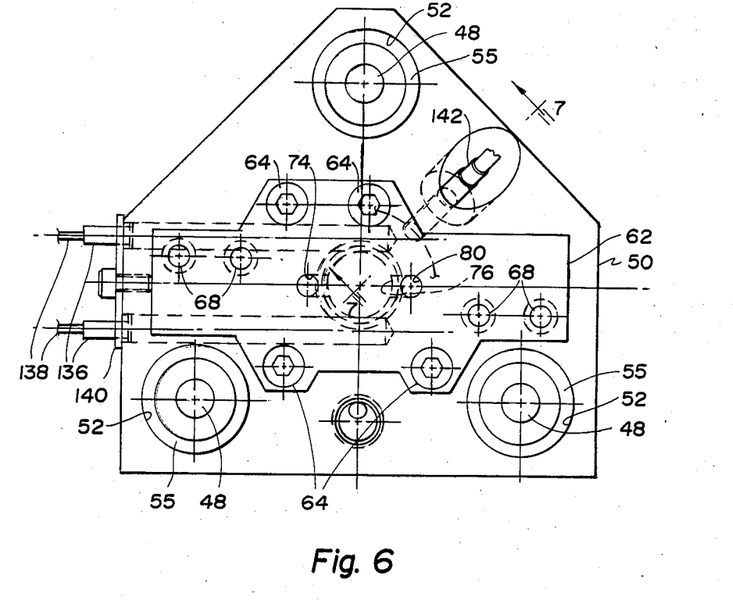
FIG. 6 is a sectional view taken along lines 6—6 in FIG. 3.
Figure 7:
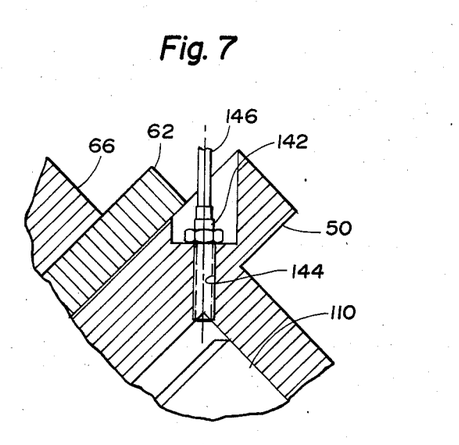
FIG. 7 is a sectional view, partially broken away, taken along lines 7—7 in FIG. 6.
Figure 8:
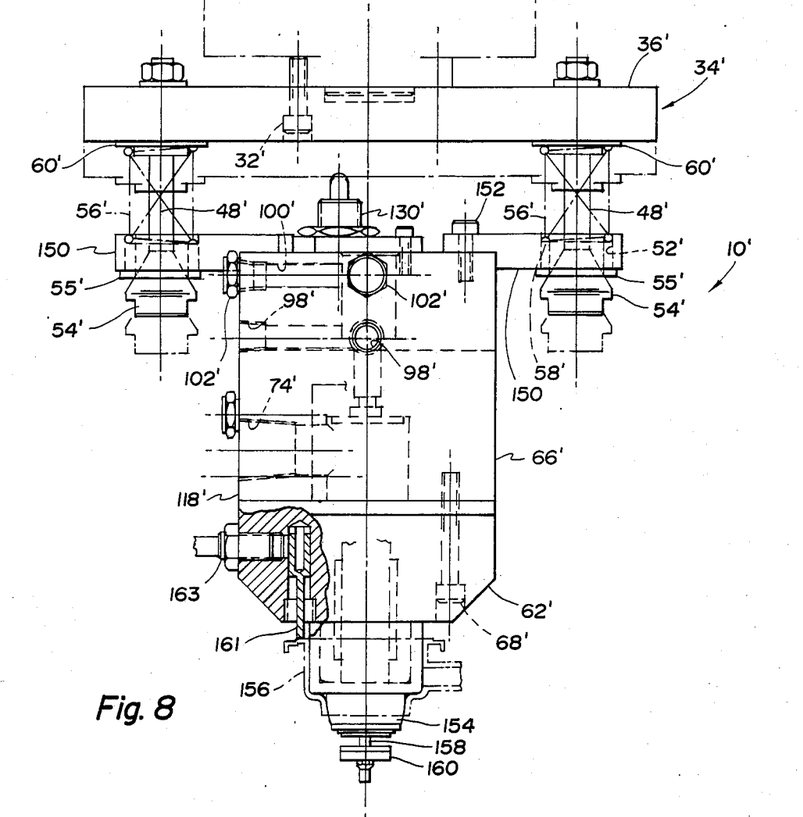
FIG. 8 is a side elevational view, partially broken away and in cross section, of a second embodiment of the device with an attached robot wrist indicated in phantom.

A proximity switch 142, as shown in FIGS. 6 and 7, extends through an aperture 144 formed in the block 50 to indicate the presence of the piston 110. A line 146 extends from the switch to the controller 14 within the cable 128. The proximity switch 142 verifies that the piston 110 is in its down or clamped position, thereby indicating that the coupling 104 has fluidly connected the device 10 to the Schrader valve 106.

Initially, during the operation of the device 10, both spool valves 84 and 86 are in the closed or down position. The plugs 94 seal off both the vacuum and refrigerant or refrigerant supply passages 74 and 80, respectively. The spool valves 84 and 86 are held closed by the return springs 92 located at the top of each spool valve 84 and 86. The lower piston 110 is held in its up position by the spring 116. This allows the device 10 to engage the Schrader valve 106 and also allows the device 10 to be removed in the event that air pressure is lost.

Once the vehicle body 16 enters the work station 12, the robot 11 guides the device 10 into its proper position and an air control signal is applied to the top surface of the piston 110. The piston 110 moves downward and thereby locks the quick disconnect female portion 108 onto the Schrader valve 106.

After the position of the piston 110 has been verified from the switch 142, a signal is sent by the controller 14 to the air source and controller 96 to supply a pressurized air signal to the bottom of the piston 90 of the spool valve 84. This causes the piston 90 of the spool valve 84 to move upward compressing its respective return spring 92 and opening the vacuum supply passage 74. The spool valve 84 remains in this position until the specified subatmospheric pressure has been reached. The top surface of the piston 90 of the spool valve 84 is then exhausted and the return spring 92 of the spool valve 84 causes the spool valve 84 to close, thereby sealing off the vacuum supply passage 74 at the plug 94.

An air control signal is then provided in the air supply passage 98 at the bottom surface of the piston 90 of the spool valve 86 thereby moving the spool valve 86 upwardly and compressing its return spring 92. This action opens the refrigerant supply passage 80. The spool valve 86 remains in this position until the specified amount of refrigerant has been dispensed. Then the air at the top surface of the piston 90 is exhausted and the return spring 92 forces the piston 90 of the spool valve 86 downward, thereby closing off the refrigerant supply passage 80 by its respective plug 94.

The evacuation and fill cycles are now complete, the air at the top of the piston 110 is exhausted and its respective return spring 116 forces the piston 110 to move upward, thereby unlocking the female end portion 108 from the Schrader valve 106. The device 10 is then removed by the robot 11, thereby completing the cycle.

Referring now to FIGS. 8 through 12 there is illustrated a second embodiment of the present invention wherein a device 10' is utilized to evacuate and fill a second container or radiator mounted on the vehicle body 16. For the sake of simplicity and clarity, parts of the device 10' which serve the same or similar functions as the parts of the device 10 are given a prime designation. Consequently, only new parts will be given new reference numerals.

The device 10' is connected to a wrist of the robot 11. A compliance mechanism, generally indicated at 34', includes brackets 150 which are fixedly connected to a valve block 66' by screws 152. Locators 48 extend through apertures 52' formed through the brackets 150. Headliners 55' are threaded in the apertures 52'. The brackets 150 also serve the dual purpose of closing the valve block 66', much like the cover 70 in the first embodiment. The lower surfaces of the brackets 150 engage one end of biasing return springs 92'.

Figure 10:
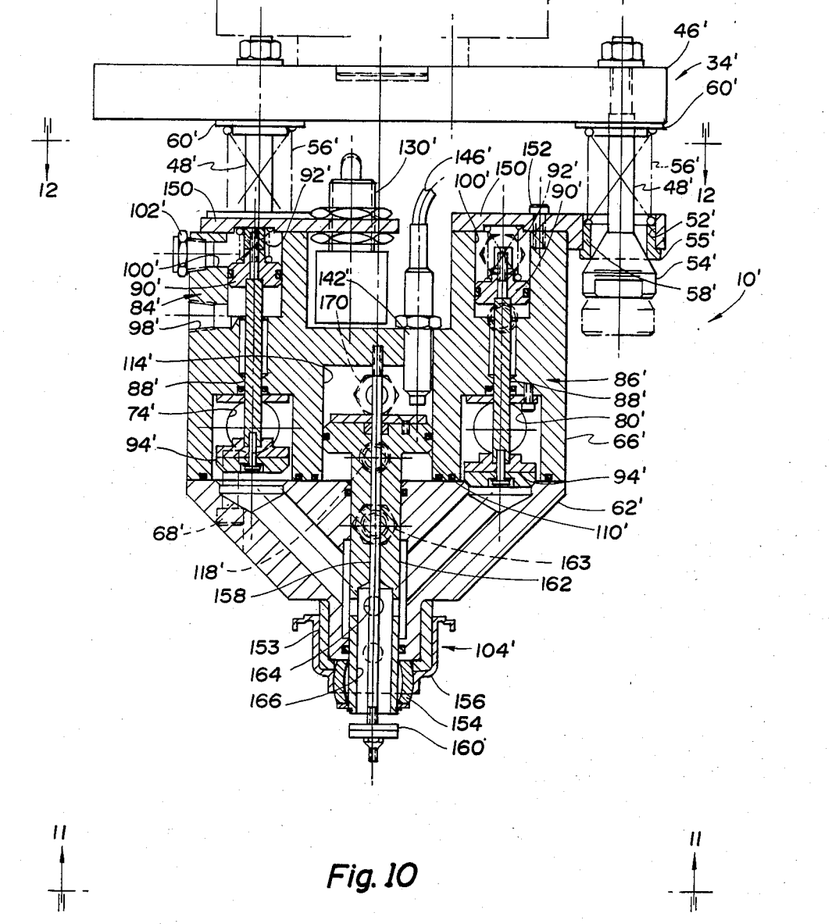
FIG. 10 is a sectional view taken along the lines 10—10 in FIG. 13 with the nozzle shown in its open position operatively connected to a radiator.
Figure 11:
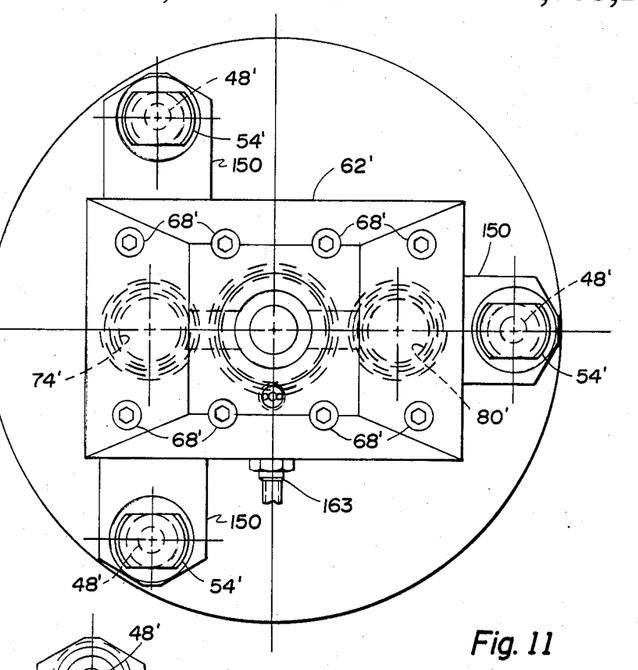
FIG. 11 is a bottom view, taken along the lines 11—11 in FIG. 10.
Figure 12:
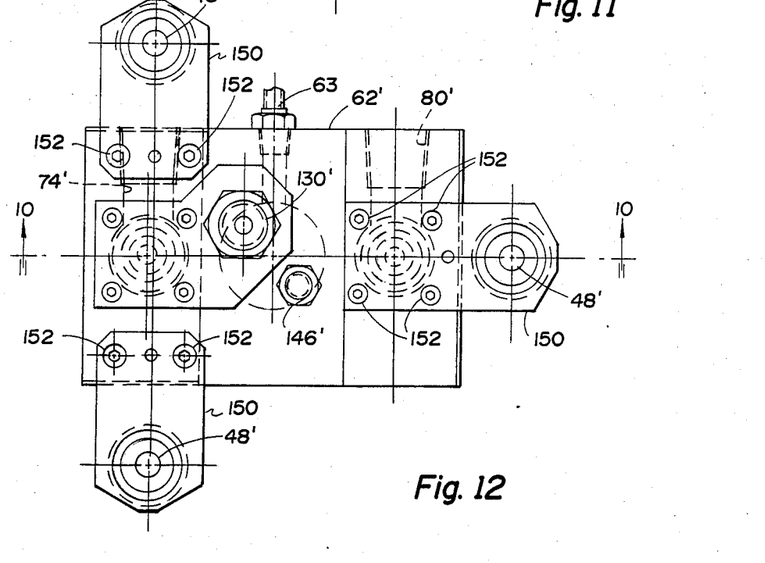
FIG. 12 is a sectional view taken along lines 12—12 in FIG. 10.

A coupling mechanism for coupling the device 10' to the fill neck 156 of a radiator is generally indicated at 104'. Alternatively, the device 10' may be coupled to any fill port of the coolant system, such as the coolant overflow bottle. The mechanism 104' includes a piston generally indicated at 110' and a rubber sleeve 154 disposed about the lower end of the piston 162. A plastic pilot 153 holds the sleeve 154 on a lower, hollow cylindrical portion 162 of the piston 110'. In a relaxed position of the sleeve 154, the device 10' may be inserted into a radiator at its fill neck 156. The rubber sleeve 154 also has an expanded position wherein it forms a seal against the edge of the fill neck 156 as best shown in FIG. 10. A ring 155 mounted on the lower end of the piston 110' by a retaining ring 157 causes the sleeve 154 to move between its relaxed and expanded positions upon reciprocation of the piston 110'.

A spring-biased plunger 161 is slidably mounted within the block 62' for engagement with a radiator fill neck 156. A proximity switch 163 mounted in the block 62' senses when the plunger 161 engages to fill neck 156 to provide a signal to the controller 14.

The piston 110' is slidably secured on a rod 158 which is threadedly mounted to the valve block 66' at one end thereof and which includes a stop member 160 secured at its opposite end thereof. The hollow cylindrical portion 162 of the piston 110 includes a pair of holes 164 formed therethrough to communicate a hollow passage 166 in the cylindrical portion 162 with the supply passages 74' and 80'.

Figure 9:
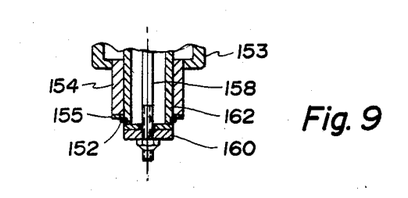
FIG. 9 is a sectional view, partially broken away and in cross section, of a nozzle or coupling mechanism of the device shown in its closed position.

The device 10' operates initially wherein both spool valves 84' and 86' are in a closed or down position. The valves 84' and 86' seal off both the vacuum and coolant passages 74' and 80', respectively. The spool valves 84' and 86' are held closed by springs 92' disposed at the top of each valve. The piston 110' is illustrated in its closed or down position as shown in FIG. 9 wherein the piston 110' relaxes the rubber sleeve 154 so that the end of the device 10' can be inserted either into the radiator overflow bottle or radiant fill neck as illustrated in phantom at 156 in FIG. 8. As illustrated in FIG. 9, the piston 110 also prevents the coolant from dripping on nearby engine components.

Once the vehicle body 16 enters the work station 12, a robot 11 guides the device 10' into the proper container 17. A pressurized air signal is then applied to the bottom surface of the piston 110' through a passage 118' thereby moving the piston 110' upward. The upward movement of the piston 110' causes the ring 155 to engage the sleeve 154 thereby causing the rubber sleeve 154 to expand to form a seal against the edge of the radiator fill neck 156. This upward movement also opens the internal passageway 166 through which the vacuum and coolant flow. A proximity switch 142' is used to verify that the piston 110 is in its open or up position.

After the piston position has been verified, a signal is sent from the robot controller 14 to the air source and controller 96 to begin the evacuation cycle. A pressurized air signal is applied to the bottom of the spool valve 84' to thereby cause the spool valve 84' to move upward, thereby compressing its respective return spring 92'. At the same time the spool valve 84' opens the vacuum supply passage 74'. The spool valve 84' remains in this position until the specified vacuum or subatmospheric pressure has been reached within the radiator. Air at the bottom of the spool valve is then exhausted through the passageway 100' and through the muffler 102', thereby causing the return spring 92' to move the spool valve 82' so that it again seals off the vacuum passage 74'.

An air control signal is then applied to the bottom of the spool valve 86' which causes the valve to move upwardly, thereby compressing its respective return spring 92'. At the same time the supply passage 80' is opened by its plug 94'. The spool valve 86' remains in this position until the specified amount of coolant has been placed in the radiator. Thereafter, air at the bottom of the spool valve 86' is exhausted through its respective passageway 100' and through its respective muffler 102'. The return spring 92' then moves the spool valve 86' downward, thereby closing off the coolant supply passage 80'.

Now that the evacuation and coolant fill cycles are complete, a signal is sent to the controller 14 of the robot 11 so that the device 10' can be removed. Air at the bottom of the piston 110' is exhausted through a muffler 170 and the biasing force of the sleeve 154 forces the piston 110 to move downward. This relaxes the rubber sleeve 154 so that the device 10' can be removed. The end of the piston 110' seals against the stop 160 to prevent dripping on the engine components. The robot 11 then removes the device 10', thereby completing the cycle.

The methods and apparatus for the automated filling of a container with a fluid as described above provide numerous advantages. For example, the methods and apparatus can be effectively incorporated into an automated "factory of the future" due to the cost savings and environmental safety inherent therein. Also, such methods and apparatus are flexible and are also compatible with factory communication systems to be able to compensate for changes in either the container or the vehicle. Reduced tooling and fixture costs are also benefits flowing from the use of such methods and apparatus.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A method for the automated filling of a container fixedly mounted on a vehicle to move therewith at a work station, the method utilizing a robot system which includes at least one robot having an arm provided with a device movable relative to at least three control axes for putting fluid into the container, the method comprising the steps of:

moving the vehicle into the work station;

locating the vehicle at the work station so that the container is positioned at an expected container location;

automatically moving the device through a predetermined motion relative to the three control axes to the expected container location so that the device mates with the container; and    automatically controlling the device so that the device puts the fluid into the container.

2. The method for automated filling of a container mounted on a vehicle to move therewith at a work station the method utilizing a robot system which includes at least one robot having an arm provided with a device movable relative to at least three control axes for putting a fluid into the container, the method comprising the steps of:

moving the vehicle into the work station;

automatically moving the device through a variable programmed motion relative to the three control axes to the actual container location so that the device mates with the container; and    automatically controlling the device so that the device puts the fluid into the container, wherein said step of moving the device includes the step of automatically adjusting said variable programmed motion towards the actual container location.

3. The method as claimed in claim 2 wherein said step of adjusting includes the step of optically measuring the three-dimensional position of the container at the work station.

4. The method as claimed in claim 2 wherein said step of adjusting includes the steps of:

optically measuring the two-dimensional position of the container; and    aligning the device with the container.

5. A device for using in an automated fluid fill system including a fluid source, a first controller for providing control signals, a robot having an arm adapted to support the device for movement relative to at least three control axes so that the robot moves the device at a work station relative to the three control axes to permit the device to automatically put the fluid into a container located at the work station, the device comprising:

a housing adapted to be connected to the robot arm for movement relative to the three control axes and having at least one supply passage extending therethrough;

coupling means adapted to receive a first control signal from the first controller for releasably and fluidly connecting the device to the container; and    a control valve mounted within said housing and adapted to receive a second control signal from the first controller to open said fluid supply passage during the fill cycle to put the fluid into the container.

6. An end effector for use in an automated fluid fill system including a fluid source, a first controller for providing control signals, a robot having an arm and a second controller for controlling the robot so that the robot moves the end effect at a work station relative to at least three control axes to permit the end effector to automatically put the fluid into a container located at the work station during a fill cycle, the end effector comprising:

a housing adapted to be connected to the digital end of the robot arm for movement relative to the three control axes and having at least one supply passage extending therethrough;

coupling means adapted to receive a first control signal from the first controller for releasably and fluidly connecting the end effector to the container; and    a control valve mounted within said housing and adapted to receive a second control signal from the first controller to open said supply passage during the fill cycle to put the fluid in the container.

7. The invention as claimed in claim 5 or claim 6 further comprising a compliance mechanism connected to said housing to compensate for a relatively small amount of misalignment between said coupling means and the container, said coupling means being adapted to mate with the container.

8. The invention as claimed in claim 5 or claim 6 wherein said valve comprises a spool valve mounted within said housing to move between at least two positions, said spool valve opening said supply passage in one of said positions.

9. The invention as claimed in claim 5 or claim 6 wherein said coupling means includes a piston mounted within said housing to move between connect and disconnect positions in response to said first control signal.

10. The invention as claimed in claim 9 including feedback means adapted to be coupled to the second controller and mounted on said housing to provide a feedback signal to indicate said fluid connection to the container, said piston being in said connect position.

11. A method for the automated filling of a container fixedly mounted on a vehicle to move therewith at a work station, the method utilizing a robot system which includes at least one robot having an arm provided with a device movable relative to at least three control axes for evacuating the container and putting a fluid into the container, the method comprising the steps of:

moving the vehicle into the work station;

locating the vehicle at the work station so that the container is positioned at an expected container location;

automatically moving the device through a predetermined motion relative to the three control axes to the expected container location so that the device mates with the container;

automatically controlling the device so that the device evacuates the container during an evacuation cycle whereby the interior of the container is at a subatmospheric pressure; and    automatically controlling the device so that the device puts the fluid into the container during the fill cycle after said step of evacuating.

12. The method for the automated filling of a container mounted on a vehicle to move therewith at a work station, the method utilizing a robot system which includes at least one robot having an arm provided with a device movable relative to at least three control axes for evacuating the container and putting a fluid into the container, the method comprising the steps of:

moving the vehicle into the work station;

automatically moving the device through a variable programmed motion relative to the three control axes to the actual container location so that the device mates with the container;

automatically controlling the device so that the device evacuates the container during an evacuation cycle whereby the interior of the container is at a subatmospheric pressure; and automatically controlling the device so that the device puts the fluid into the container during a fill cycle after said step of evacuating, wherein said step of moving the device includes the step of automatically adjusting said variable programmed motion towards the actual container location.

13. The method as claimed in claim 12 wherein said step of adjusting includes the step of optically measuring the three-dimensional position of the vehicle at the work station.

14. The method as claimed in claim 12 wherein said step of adjusting includes the steps of:
optically measuring the two-dimensional position of the container; and
aligning the device with the container.

15. The method as claimed in claim 11 or claim 12 including the step of maintaining the subatmospheric pressure within the container during the fill cycle.

16. A device for use in an automated fluid fill system including a vacuum source, a fluid source, a first controller for providing control signals, a robot having an arm adapted to support the device for movement relative to at least three control axes and a second controller for controlling the manipulator so that the manipulator moves the device at a work station relative to the three control axes to permit the device to automatically evacuate a container located at the work station during an evacuation cycle and to put the fluid into the container during a fill cycle after the evacuation cycle, the device comprising:
a housing adapted to be connected to the robot arm for movement relative to the three control axes and having vacuum and fluid supply passages extending therethrough;
coupling means adapted to receive a first control signal from the first controller for releasably and fluidly connecting the device to the container;
a first control valve mounted within said housing and adapted to receive a second signal from the first controller to open said vacuum supply passage during the evacuation cycle to evacuate the container; and
a second control valve mounted within said housing and adapted to receive a third signal from the first controller to open said fluid supply passage during the fill cycle to put the fluid into the container.

17. An end effector for use in an automated fluid fill system including a vacuum source, a fluid source, a first controller for providing control signals, a robot having an arm and a second controller for controlling the robot so that the robot moves the end effector at a work station relative to at least three control axes to permit the end effector to automatically evacuate a container located at the work station during an evacuation cycle and put the fluid into the container during a fill cycle after the evacuation cycle, the end effector comprising:
a housing adapted to be connected to the distal end of the robot arm for movement relative to the three control axes and having vacuum and fluid supply passages extending therethrough;
coupling means adapted to receive a first control signal from the first controller for releasably and fluidly connecting the end effector to the container;
a first control valve mounted within said housing and adapted to receive a second control signal from the first controller to open said vacuum supply passage during the evacuation cycle to evacuate the container; and
a second control valve mounted within said housing and adapted to receive a third control signal from the first controller to open and close said fluid supply passage during the fill cycle to put the fluid in the container.

18. The invention as claimed in claim 17 or claim 16 further comprising a compliance mechanism connected to said housing to compensate for a relatively small amount of misalignment between said coupling means and the container, said coupling means being adapted to mate with the container.

19. The invention as claimed in claim 17 or claim 16 wherein the control signals are pressurized air signals.

20. The invention as claimed in claim 17 or claim 16 wherein at least one of said valves comprises a spool valve mounted within said housing to move between at least two positions, said spool valve opening one of said supply passages in one of said positions.

21. The invention as claimed in claim 17 or claim 16 wherein said coupling means includes a piston mounted within said housing to move between connect and disconnect positions in response to said first control signal.

22. The invention as claimed in claim 21 including feedback means adapted to be coupled to the second controller and mounted on said housing to provide a feedback signal to indicate said fluid connection to the container, said piston being in said connect position.

* * * * *